(12) United States Patent
Johnson

(10) Patent No.: US 9,752,896 B2
(45) Date of Patent: Sep. 5, 2017

(54) EXTENDED STROKE POSITION SENSOR

(71) Applicant: LITTELFUSE, INC., Chicago, IL (US)

(72) Inventor: Brian Johnson, Saltash Cornwall (GB)

(73) Assignee: LITTELFUSE, INC., Chicago, IL (US)

( * ) Notice: Subject to any disclaimer, the term of this patent is extended or adjusted under 35 U.S.C. 154(b) by 24 days.

(21) Appl. No.: 14/414,278

(22) PCT Filed: Aug. 13, 2013

(86) PCT No.: PCT/US2013/054701
§ 371 (c)(1),
(2) Date: Jan. 12, 2015

(87) PCT Pub. No.: WO2014/028469
PCT Pub. Date: Feb. 20, 2014

(65) Prior Publication Data
US 2015/0211888 A1    Jul. 30, 2015

Related U.S. Application Data

(60) Provisional application No. 61/682,818, filed on Aug. 14, 2012.

(51) Int. Cl.
| | |
|---|---|
| *G01R 27/04* | (2006.01) |
| *G01D 5/12* | (2006.01) |
| *G01D 5/48* | (2006.01) |
| *G01B 7/00* | (2006.01) |

(52) U.S. Cl.
CPC .............. *G01D 5/12* (2013.01); *G01B 7/003* (2013.01); *G01D 5/48* (2013.01)

(58) Field of Classification Search
CPC ............. G01D 5/12; G01D 5/48; G01B 7/003
USPC ...................... 324/207.13, 635, 644; 318/669
See application file for complete search history.

(56) References Cited

U.S. PATENT DOCUMENTS

| | | | |
|---|---|---|---|
| 4,604,576 A | 8/1986 | Barrault | |
| 4,749,936 A * | 6/1988 | Taplin | ................ G01D 5/243 318/669 |
| 2010/0301973 A1 | 12/2010 | Stanec et al. | |
| 2011/0132641 A1* | 6/2011 | Wong | ..................... H01P 3/121 174/254 |

FOREIGN PATENT DOCUMENTS

| | | |
|---|---|---|
| JP | 2001133313 A | 5/2001 |
| JP | 2003106804 A | 4/2003 |

* cited by examiner

*Primary Examiner* — Farhana Hoque

(57) ABSTRACT

A position sensing system including a waveguide positioned adjacent to a quantity of soft or semi-soft magnetic material is described. A magnet, movable relative to the waveguide and magnetic material, closely positioned to the magnetic material and configured to generate a local magnetic field sufficient to locally saturate the magnetic material. The saturated magnetic material operates to change the characteristic impedance of the waveguide at the point of saturation, which causes signals to be reflected at the point of impedance discontinuity. A signal generator for communicating a first signal to the waveguide and a signal receiver for receiving the first signal and/or the reflected signal and a position sensing processor or circuit for determining the position of the waveguide relative to the magnet based on the first signal and the reflected signal are described.

16 Claims, 4 Drawing Sheets

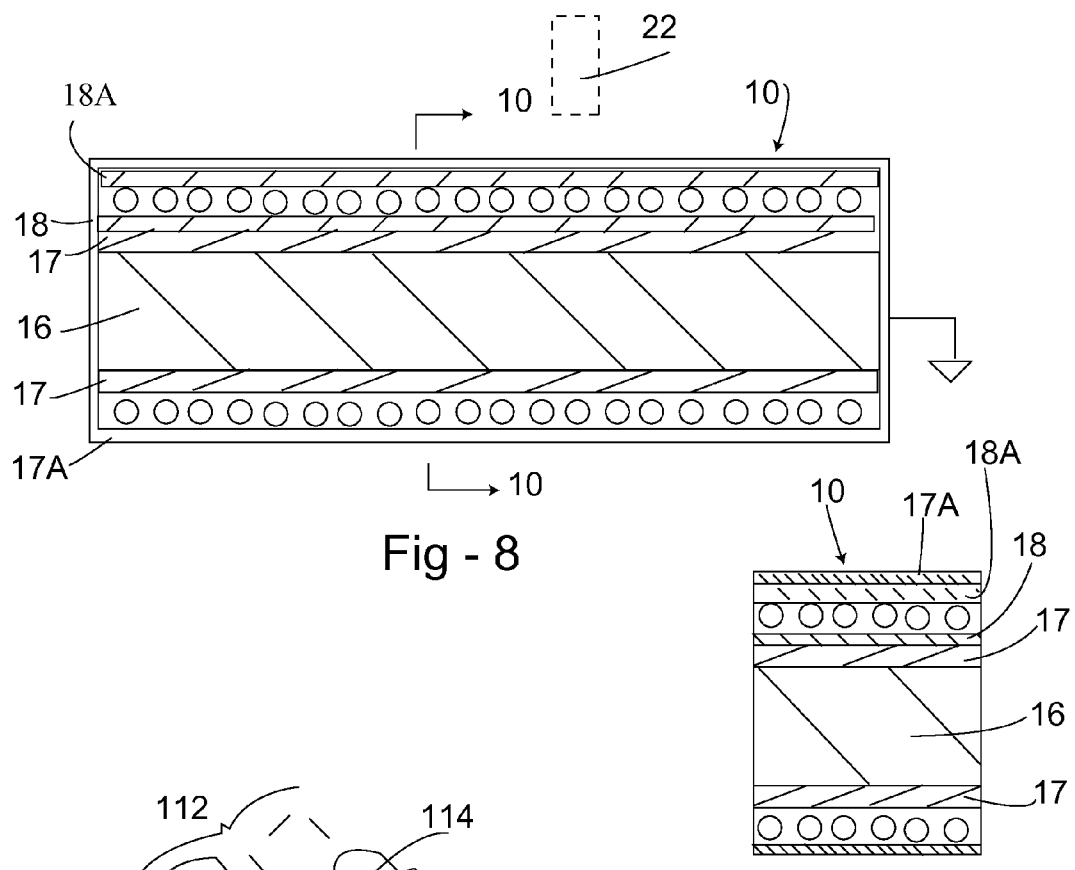
Fig - 8
Fig - 9
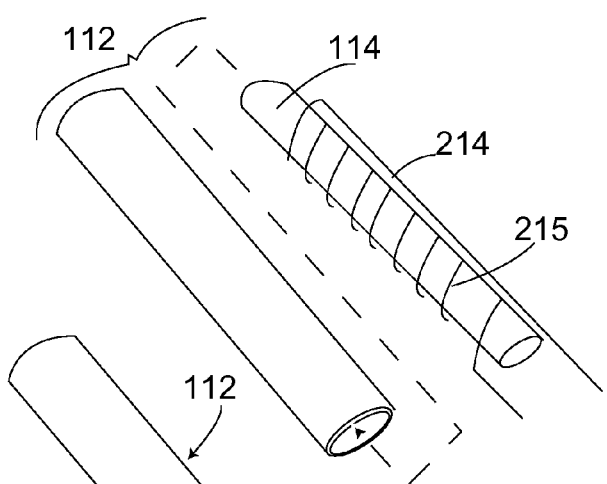
Fig - 6
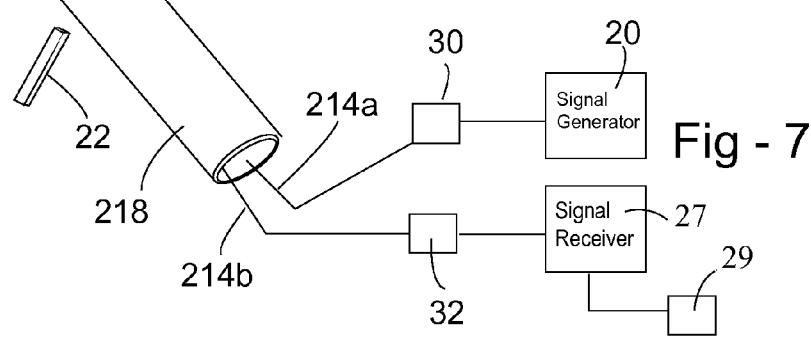
Fig - 7

EXTENDED STROKE POSITION SENSOR

CROSS-REFERENCE TO RELATED APPLICATION

This application claims the benefit of U.S. Provisional Application Ser. No. 61/682,818 filed Aug. 14, 2012, entitled "EXTENDED STROKE POSITION SENSOR," which application is incorporated herein by reference in its entirety.

BACKGROUND OF THE INVENTION

Field of the Invention

Embodiments of the present disclosure relate generally relates to position sensors and more particularly to an elongated or extended stroke position sensor comprising a waveguide and a magnet.

Discussion of Related Art

Most non-contacting position sensors are based on Hall or magnetostrictive technology. The effective maximum stroke length that these types of position sensors are able to accurately sense is limited to about 20 mm; beyond 20 mm, the ability to linearly sense the magnetic field strength limits the performance of the position sensor. In particular, the sensitivity and accuracy of the position sensor suffers. As such, more complex, and often more expensive, measurement systems are used to determine the position of objects having a stroke of greater than 20 mm. For example, in order to measure the position of a piston in a cylinder, which typically has a stroke greater than 20 mm, a magnetic sensor may be used. However, the configuration of the magnetic sensor may necessitate that the length of the magnet would be approximately the same length as the stroke. As such, the cylinder size would have to be increased to include such a sensor.

Some non-contact position sensors use a magnetostrictive magnet-waveguide to measure position. For example, a circular magnet is positioned about a magnetostrictive waveguide. The position of the circular magnet is used to identify the position to be measured. An electric wire extends the length of the waveguide. A pulse of current is placed upon the wire, which creates a second magnetic field. The second magnetic field interferes with the magnetic field created by the circular magnet, thereby creating a torque pulse located at the position of the circular magnet. The time it takes for the torque pulse to move to a sensor head is correlated with the position of the circular magnet. An example of such a system is described in U.S. Pat. No. 5,717,330, which is incorporated herein by reference. As will be appreciated, the torque pulse moves down the waveguide at the speed of sound. While this is relatively fast, if the magnet is placed on a fast-moving machine head measurement inaccuracies may be produced.

Additionally, some non-contact position sensors use other types of waveguides. However, these other types of waveguides may rely on interactions with the local environment to measure position. For example, U.S. Pat. No. 5,249,463, which is incorporated herein by reference, teaches a waveguide used to determine the level of a liquid. However, as will be appreciated, the accuracy of such position sensors will be affected by exposure to the environment (e.g., other liquids, oils, etc.).

Thus there is a need for a non-contact position sensor configured to measure objects having a stroke greater than 20 mm, which may move at relatively fast speeds, and which may be operated in harsh environments (e.g., exposed to liquids, oils, etc.).

SUMMARY OF THE INVENTION

Various embodiments of the present disclosure provide a position sensing system for determining a position of a moveable object using a sensor and a magnet, wherein the position of the moveable object is determined relative to either the sensor of the magnet. With some examples, the system comprises an extended stroke position sensor comprising a waveguide having a given characteristic impedance and a magnetic material positioned in close proximity to the waveguide, the magnetic material comprising soft or semi-soft magnetic material, a signal generator communicatively coupled to the waveguide and a signal receiver, the signal generator configured to generate a first signal and communicate the first signal to the waveguide and the signal receiver, one or more impedance matching devices electrically coupled to the waveguide and configured such that the waveguide is impedance matched with the signal generator and the signal receiver, a magnet movable relative to the extended stroke position sensor, the magnet configured to generate a magnetic field sufficient to locally saturate the magnetic material, wherein the magnetic material configures to cause an impedance discontinuity in the waveguide such that the first signal is reflected at the point of the impedance discontinuity and communicated to the signal receiver, and a position sensor circuit communicatively coupled to the signal receiver, the position sensor circuit configured to determine the position of the magnet relative to the extended stroke position sensor based in part on the first signal and the reflected signal as received by the signal receiver.

Some examples of the present disclosure provide an extended stroke position sensor comprising a waveguide having a given characteristic impedance, the waveguide configured to receive a first signal and a magnetic material positioned in close proximity to the waveguide, the magnetic material comprising soft or semi-soft magnetic material, wherein the magnetic material is configured to cause an impedance discontinuity in the waveguide when the magnetic material is saturated by a local magnetic field, the impedance discontinuity configured such that the first signal is reflected at the point of the impedance discontinuity.

Some examples of the present disclosure provide a method of determining a position of a moveable object comprising generating a first signal by a signal generator, communicating the first signal to a waveguide of an extended stroke position sensor, the extended stroke position sensor comprising the waveguide and a magnetic material positioned in close proximity to the waveguide, the magnetic material comprising soft or semi-soft magnetic material, moving a magnet into close proximity to the extended stroke position sensor, the magnet configured to generate a magnetic field sufficient to locally saturate the magnetic material, wherein the magnetic material configures to cause an impedance discontinuity in the waveguide such that the first signal is reflected at the point of the impedance discontinuity, communicating the reflected signal to a signal receiver, and determining the position of the moveable object based on the received first signal and the received reflected signal.

BRIEF DESCRIPTION OF THE DRAWINGS

FIGS. 6-7 are block diagrams illustrating an additional embodiment of a position sensing system;

FIGS. 8-9 are block diagrams illustrating an additional embodiment of a sensor.

DESCRIPTION OF EMBODIMENTS

Figure 1:
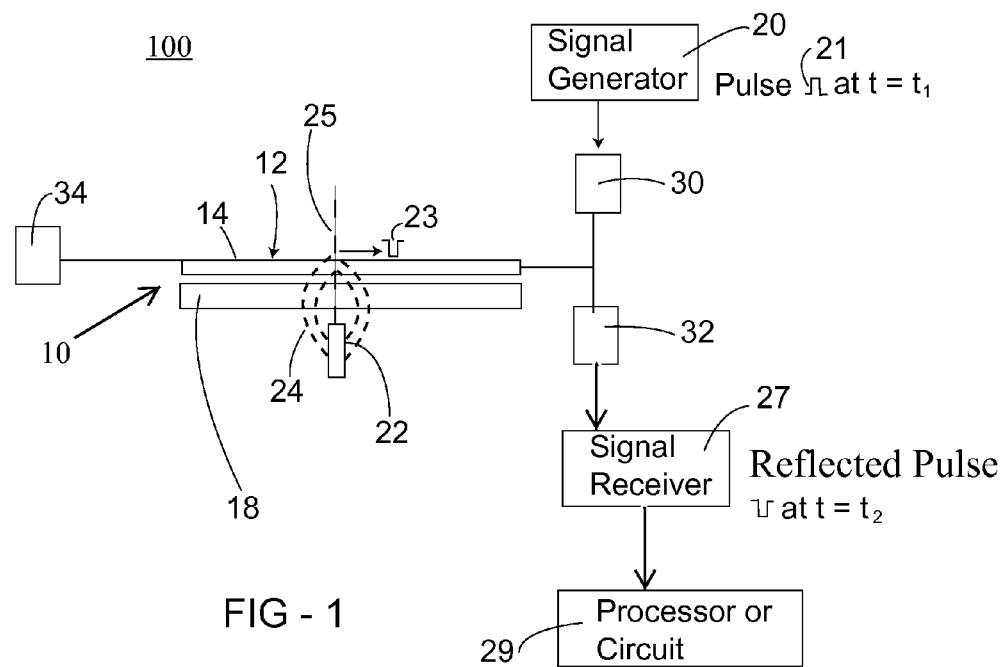
FIG. 1 is a block diagram illustrating a positioning sensing system.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a block diagram illustrating a position sensing system 100 that includes an extended stroke position sensor 10, arranged in accordance with at least some embodiments of the present disclosure. The extended stroke position sensor 10 (sometimes referred to herein as the "sensor") comprises a waveguide 12. In general, the waveguide 12 may be any type of waveguide (e.g., a microstrip waveguide, a stripline waveguide, a rectangular waveguide, or the like). The waveguide 12 includes at least one conductive strip 14 formed (e.g., printed, affixed, or the like) on an upper surface of the waveguide 12. The conductive strip 14 may be any conductive material (copper, silver, or the like).

The position sensor 10 further includes magnetic material 18 positioned in close proximity to the waveguide 12. For example, an air gap or spacing between the waveguide 12 and magnetic material 18 may be between 0 mm and 15 mm. In some examples, the waveguide 12 and the magnetic material 18 are fixed relative to one another. The magnetic material 18 may be a thin sheet of soft or semi-soft magnetic material (e.g., materials having a low or relatively low magnetic saturation field). In some examples, the magnetic material 18 may be a soft magnetic material having a magnetic saturation field Hs of between 3 Nm to 100 Nm. With some examples, the magnetic material 18 may be a semi-soft magnetic material having a magnetic saturation field Hs of between 100 Nm to 3000 Nm. In some examples, the thickness of the magnetic material 18 is 1 mm. With some examples, the thickness of the magnetic material 18 is between approximately 0.1 mm and 10 mm.

The position sensor 10 works in conjunction with a magnet 22 (e.g., a permanent magnet, an electromagnet, or the like). The magnet 22 is movable relative to the waveguide 12, the conductive strip 14 and the magnetic material 18. In general, the magnet 22 creates an impedance discontinuity in the waveguide 12. The impedance discontinuity is created at the location of the magnet 22 relative to the position sensor 10. As will be described in greater detail below, the location of the position sensor 10 relative to the magnet 22 can be determined based on these impedance discontinuities.

The sensing system 100 further includes various elements shown as blocks 30, 32, and 34, which diagrammatically represent known types of impedance matching devices. As will be appreciated, when the impedance of the waveguide 12 is not accurately matched to its load or source, or if a discontinuity is created in the impedance of the waveguide 12, a reflected wave, originating at the point of the discontinuity will result. Accordingly, the impedance matching devices 30, 32, and 34 are configured such that the position sensor 10, including the waveguide 12, is impedance matched. As a result, when the magnet 22 is not adjacent to the position sensor 10, the waveguide 12 will not reflect signals. When the magnet 22 is placed adjacent to the sensor, however, an impedance discontinuity will be created in the waveguide 12, which will result in the generation of reflected waves. For example, FIG. 1 depicts a point of impedance discontinuity, which is generally shown by dotted line and numeral 25.

In general, the magnet 22 causes a reduction in the magnetic permeability of the magnetic material 18, which results in the impedance discontinuity in the waveguide 12. The magnet 22 is of sufficient strength to generate a magnetic field 24 (shown by dashed lines) that is capable of completely and/or at least partially magnetically saturating the magnetic material 18. As will be appreciated, the waveguide 12 has a given value of impedance (referred to as the characteristic impedance), however, the characteristic impedance of the waveguide 12 is strongly affected by the permeability of the material surrounding it (e.g., the magnetic material 18). As described above, the magnetic material 18 is positioned closely to the waveguide 12. As a result, a change in the permeability of the magnetic material 18 will affect the characteristic impedance of the waveguide 12.

More specifically, introduction of the magnet 22 into the impedance matched system comprising the waveguide 12, magnetic material 18 and the impedance matching devices 30, 32, and 34 reduces the permeability of the magnetic material 18. The reduction in the permeability of the magnetic material 18 is proportional to the strength of the magnet 22. If the magnet 22 is sufficiently strong, the reduction in permeability can approach zero in the limit. As a result, the magnetic field 24 of magnet 22 creates a localized, significant change in the characteristic impedance of the waveguide 12 by changing the permeability of the magnetic material 18. This change results in a discontinuity in the effective impedance of the waveguide 12, which will be located at the magnetic field 24 of the magnet 22 (e.g., the point of discontinuity 25). The impedance discontinuity causes a travelling wave to be reflected back to the source from this point of discontinuity. This reflected wave can be used to determine the location of the position sensor 10 relative to the magnet 22.

In practice, either the magnet 22 or the position sensor 10 may be attached to a moveable object whose position is to be sensed. For example, in some embodiments, the magnet 22 can be affixed to a movable object (e.g., a sewing head, a laser, a welding tip, a liquid float, or the like). The position sensor 10 can be affixed to a cooperating structure that may be placed along the path of the moveable object. As another example, in some embodiments, the position sensor 10 can be affixed to a movable object while the magnet 22 is affixed to a cooperating structure. Accordingly, the location of the moveable object can be determined based on determining the location of the position sensor 10 relative to the magnet 22.

In order to determine the location of the position sensor 10 relative to the magnet 22, the sensing system 100 includes a signal generator 20, a signal receiver 27, and a position sensing processor or circuit 29. The signal generator 20 and the signal receiver 27 are operatively connected to the waveguide 12 (e.g., via electrical connection with the conductive strip 14). The signal generator 20 is configured to generate signal pulses (e.g., signal pulse 21), which are communicated to and reflected (e.g., reflected pulse 23) by the waveguide. The signal receiver 27 receives the signal pulses and the reflected pulses. The position sensing processor or circuit 29 is operably connected to the signal receiver 27 and configured to determine the position of the position sensor 10 relative to the magnet 22 based on the timing of the signal pulses and the reflected pulse received by the signal receiver 27.

FIG. 1 inherently depicts a distance measuring technique that can be performed by the sensing system 100. In some examples, the signal generator 20 may be configured to repeatedly (e.g., periodically, or the like) generate pulses. With some examples, the generated pulse may be a single pulse (e.g., the pulse 21). With further examples, the generated pulse may be a series of pulses (e.g., a number of the pulses 21). The pulse 21 is communicated to the position sensor 10, which reflects the pulse 21 (e.g., reflected pulse 23) due to the impedance discontinuity 25 in the waveguide 12 that is caused by the magnet 22. The reflected pulse 23 is communicated from the position sensor 10 to the signal received 27. The time difference between incident and reflective pulses is a measure of the position of the magnet 22 in relation to the waveguide 12. The position sensing processor or circuit 29 is configured to determine the location of the position sensor 10 relative to the magnet 22 based on the timing of the incident and reflected pulses.

For example, FIG. 1 depicts the signal generator 20 generating the pulse 21 at time t=t1. The pulse 21 is shown being reflected from the point of impedance discontinuity 25 as the reflected pulse 23. The reflected pulse 23 is then shown being received by the signal receiver 27 at time t=t2. The position sensing processor or circuit 29 can then determine the position of the position sensor 10 relative to the magnet 22 (and as a result, a device whose position is to be sensed) based on t1 and t2.

One benefit of the present disclosure is the magnetic material 18 effectively shields the waveguide 12 from disturbances created in a local environment, which is a deficiency of some prior position sensing systems. Additionally, the magnetic material 18 functions to contain the electric and magnetic waves in the waveguide to reduce interaction with the environment. For example, if the waveguide is used as a liquid level sensor and partially immersed in a liquid without the magnetic material, the impedance of the waveguide would be unmatched and reflections would occur. With the magnetic material positioned on or close to the waveguide, the magnetic material shields the waveguide from external disturbances, the consequence of which is the impedance mismatch is effectively caused only by the introduction of the magnetic field of the magnet, which results in the above-mentioned reflected wave. Furthermore, as the waveguide 12 is impedance matched by the magnetic material 18 and the impedance matching devices 30, 32, and 34, there may be no reflections when the magnet 22 is not present.

Figure 2:
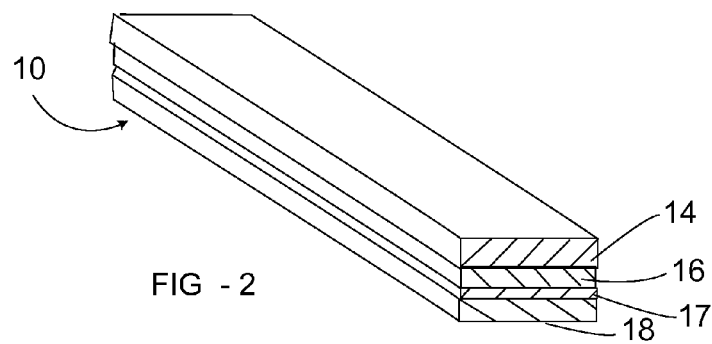
FIG. 2 is a block diagram illustrating an additional embodiment of a sensor.

FIG. 2 is a block diagram illustrating an additional embodiment of position sensor 10. As depicted, the position sensor 10 includes a first conductive strip 14 disposed on a substrate 16. The substrate 16 is disposed on a second conductive layer 17. The second conductive layer 17 may be a conductive metal or conductive metalized rear sheet affixed to substrate 16. A thin sheet of soft or semi-soft magnetic material 18 is positioned adjacent the second conductive layer 17. In some embodiments, the second conductive layer 17 may be grounded, which may enhance the shielding effects of the conductive layer 217.

Figure 3:
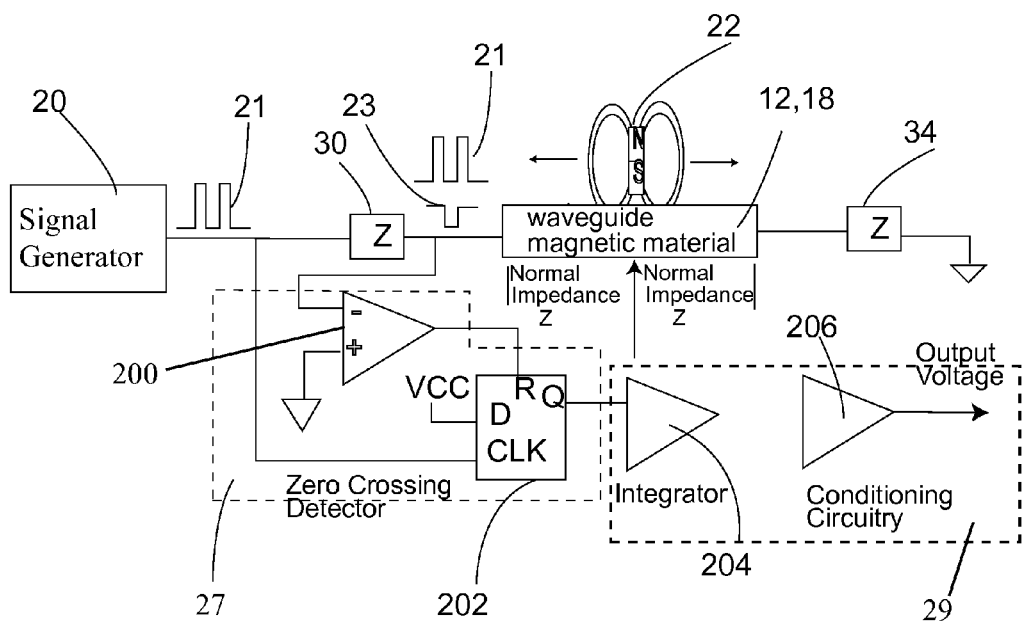
FIG. 3 is a block diagram illustrating an additional embodiment of a position sensing system.

FIG. 3 is a block diagram illustrating the sensing system 100, arranged according to at least some embodiments of the present disclosure. In FIG. 3, the waveguide 12 and magnetic material 18 are shown. Additionally, the magnet 22 is shown positioned adjacent to the waveguide 12 and on the opposite side as the magnetic material 18. The magnet 22 is shown positioned at the midpoint of the waveguide 12. However, it is to be appreciated, that the magnet 22 and the waveguide 12 are moveable relative to each other and depicting the magnet 22 at the midpoint is done for convenience and is not intended to be limiting. Impedance matching devices 30 and 34 are also shown. The signal generator 20 is shown, electrically connected to the waveguide 12 and the signal receiver 27. Furthermore, the signal receiver 27 is electrically connected to the waveguide 12 and the position sensing processor or circuit 29. As depicted, the signal generator 20 generates a pulse, or series of pulses, 21 that are communicated to the waveguide 12 and the signal receiver 27. As depicted, the signal receiver 27 comprises a zero crossing detector using an amplifier 200 and a logic gate 202 (e.g., d-type flip-flop, or the like). As will be appreciated, the signal received is configured such that the logic gate 202 is set on the rising edge of the pulse 21 and is reset after the reflated pulse 23 crosses zero. The position sensing processor or circuit 29 comprising an integrator 204 and a conditioning circuit 206.

Figure 4:
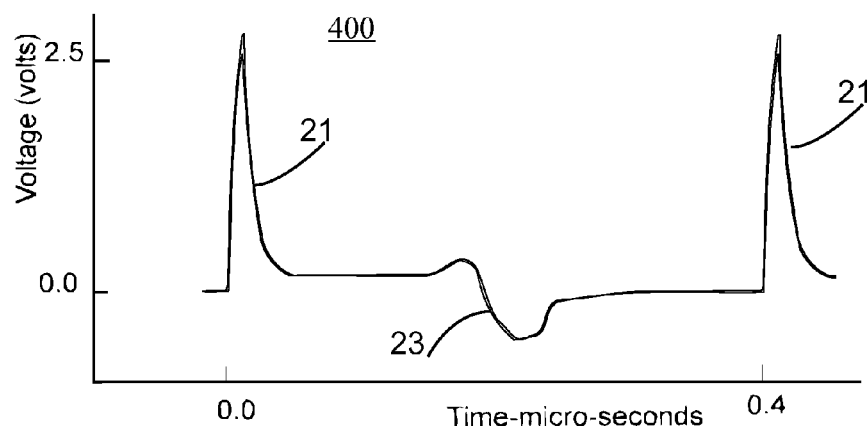
FIG. 4 illustrates an example waveform generated by the position sensing system.

FIG. 4 shows an example waveform 400, which may appear on the driven end of the waveguide 12 during operation of the sensing system 100. As depicted, the waveform 400 shows a series of voltage pulses 21 with a reflected pulse 23 between them.

Figure 5:
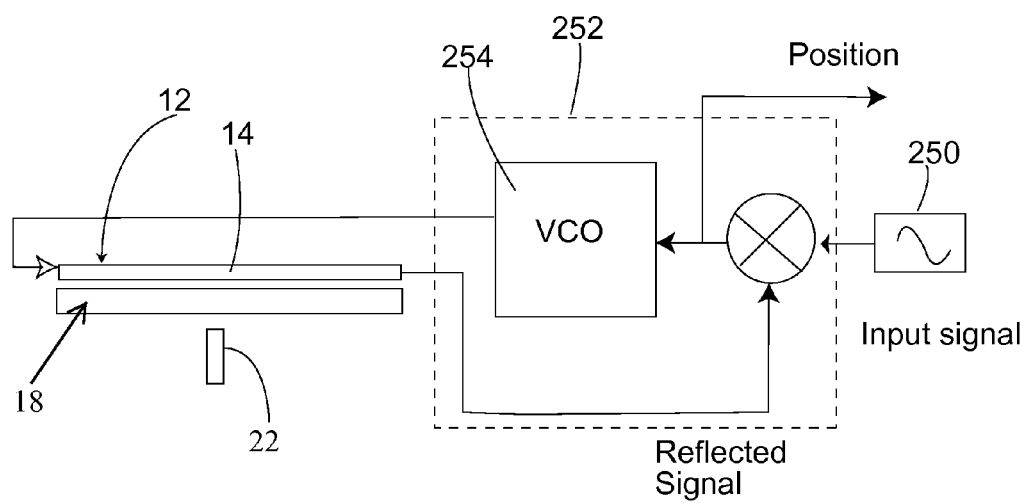
FIG. 5 is a block diagram illustrating an additional embodiment of a positioning sensing system.

FIG. 5 is a block diagram illustrating a position sensing system 500, arranged according to at least some embodiments of the present disclosure. As depicted, the system 500 includes a periodic waveform generator 250 operably connected to a known phase detector 252. The phase detector 252 comprises a voltage controlled oscillator (VCO) 254. The phase detector 252 is electrically connected to the waveguide 12 via the conductive strip 14. Furthermore, the magnetic material 18 and the magnet 22 are also depicted.

The output of the phase detector 252 is a signal representative of the phase difference between the periodic reference signal having a frequency fl and the reflected (or feedback signal) also having a frequency fl. However, as will be appreciated, the reflected signal will be displaced in phase relative to the reference signal due to the impedance discontinuity in the waveguide 12 caused by the magnet 22. The output of the (VCO) 254 is a constant amplitude signal having a frequency that varies with measured phase difference between the reference signal and the reflected signal. In essence, by measuring the phase between the initial time of the reference signal and the reflected signal, the position of the magnet 22 relative to the waveguide 12 may be determined.

FIGS. 6-7 are block diagrams illustrating a positing sensing system 600, arranged according to at least some embodiments of the present disclosure. As depicted, the system 600 includes the signal generator 20, the signal receiver 27, and position sensing processor or circuit 29 operably connected to a waveguide 112. The magnet 22 is shown, positioned adjacent to the waveguide 112. Turning more specifically to FIG. 6 the waveguide 112 comprises a central conductive core 114 (e.g., copper, or the like) with a second conductor 214 (e.g., wire), wound about the conductive core in a spiral 215. The extended length of the second conductor 214 wound around the central conductive code 114 effectively has the benefit of creating a longer waveguide in a smaller package. Additionally, the use of the spiral 215 to wind the second conductor 214 provides an increased mechanical efficiency where a small linear movement of the magnet 22 along the axis of the waveguide 112 corresponds to a longer distance the reflected wave has to travel along the spiral 215. This construction may provide for improving accuracy and slowing down the pulses, which may allow for simpler implementations. The central conductive core 114 with the conductor 214 wrapped thereabout is positioned within a cylindrical housing 218. The cylindrical housing 218 is formed of a soft or semi-soft magnetic material.

Turning more specifically to FIG. 7, ends of the second conductor 214, depicted as 214a and 214b extend outside the cylindrical housing 218. The impedance matching device 30 and the signal generator 20 are electrically connected to one end of the second conductor 214 (e.g., the end 214a) while the impedance matching device 32 and the signal receiver 27 are electrically connected to the other end of the second conductor 214 (e.g., the end 214b).

FIGS. 8-9 are block diagrams illustrating additional embodiments of the position sensor 10. As depicted, the position sensor 10 may comprise the substrate 16 covered on upper and lower surfaces with the conductive layer 17, which may operate to isolate the waveguide from the environment. The side of the position sensor 10 facing the magnet is referred to as the active side. Position sensor 10 further includes a first layer of magnetic material 18 disposed on the active side of the position sensor 10. A wire coil 215 spirally envelopes the first layer of magnetic material 18, layers 17 and the substrate 16. In some example, the wire coil 215 should be insulated from the layers 17, for example the wire could include an electrically insulative coating. A second layer of magnetic material 18A covers the wire coil 215 on the active side of the position sensor 10. The position sensor 10 further includes a second conductive layer 17A, for example, a thin copper sheet or tape or foil, covering the entire structure. In some examples, the distance between the magnet 22 and the active side of the position sensor 10 should be sufficient to locally saturate the waveguide (e.g., saturate the magnetic material 18 and/or 18A) and, depending upon the strength of the magnet, may be about 6 mm.

Figure 10:
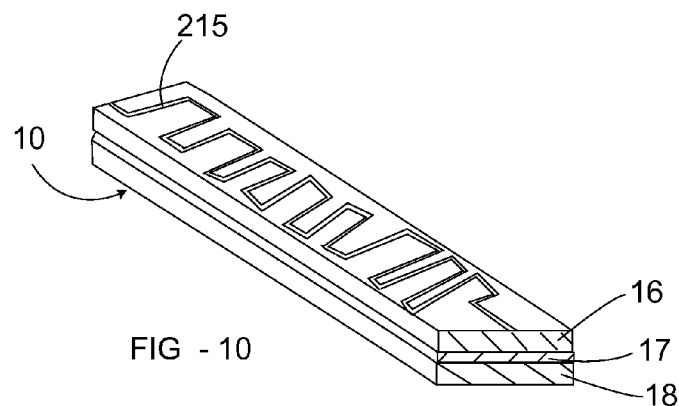
FIG. 10 is a block diagram illustrating an additional embodiment of a sensor, all arranged according to at least some embodiments of the present disclosure.

FIG. 10 is a block diagram illustrating an additional embodiment of the position sensor 10. As depicted, the position sensor 10 may comprise the substrate 16 with the magnetic material 18 positioned adjacent to the substrate 16 with a conductive layer 17 disposed between the substrate 16 and the magnetic material 18. Another conductive layer 215, which may have a zigzag, spiral, or other shaped configuration is etched or otherwise deposited on the substrate 16. The conductive layer 215 facilitates electrically connecting the position sensor 10 to the sensing system 100. This position sensor 10 described in FIG. 10 may facilitate realizing a waveguide having an effective length similar to that described with respect to FIGS. 6-7.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A position sensing system comprising:
   an extended stroke position sensor comprising:
   a waveguide having a given characteristic impedance; and
   a cylinder of magnetic material positioned in close proximity to the waveguide, the cylinder of magnetic material comprising soft or semi-soft magnetic material, wherein the waveguide comprises a copper core and a conductive wire wound along a longitudinal axis of the core in a spiral, the core and the spiral wound conductive wire being receivable within the cylinder of magnetic material;
   a signal generator communicatively coupled to the waveguide and a signal receiver, the signal generator configured to generate a first signal and communicate the first signal to the waveguide and the signal receiver;
   one or more impedance matching devices electrically coupled to the waveguide and configured such that the waveguide is impedance matched with the signal generator and the signal receiver;
   a magnet movable relative to the extended stroke position sensor, the magnet configured to generate a magnetic field sufficient to locally saturate the magnetic material, wherein the magnetic material is configured to cause an impedance discontinuity in the waveguide such that the first signal is reflected at the point of the impedance discontinuity and communicated to the signal receiver; and
   a position sensor circuit communicatively coupled to the signal receiver, the position sensor circuit configured to determine the position of the magnet relative to the extended stroke position sensor based in part on the first signal and the reflected signal as received by the signal receiver;
   wherein the cylinder of magnetic material encases the waveguide.

2. The system according to claim 1, wherein the magnet comprises either a permanent magnet or an electro-magnet.

3. The system according to claim 1, wherein the waveguide is one of a microstrip waveguide, a stripline waveguide, or a rectangular waveguide.

4. The system according to claim 1, the extended stroke position sensor further comprising a first conductive layer disposed on the waveguide, the first conductive layer electrically coupled to the signal generator and the signal receiver.

5. The system according to claim 4, the extended stroke position sensor further comprising a second conductive layer disposed between the waveguide and the magnetic material, the second conductive layer configured to shield the waveguide from electrical interference.

6. The system according to claim 5, wherein the second conductive layer is grounded.

7. The system according to claim 1, wherein a first end of the conductive wire is electrically coupled to the signal generator and a second end of the conductive wire is electrically coupled to the signal receiver.

8. The system according to claim 1, wherein the signal generator is configured to repeatedly generate a series of pulses.

9. An extended stroke position sensor comprising:
a waveguide having a given characteristic impedance, the waveguide configured to receive a first signal; and
a cylinder of magnetic material positioned in close proximity to the waveguide, the cylinder of magnetic material comprising soft or semi-soft magnetic material, wherein the magnetic material is configured to cause an impedance discontinuity in the waveguide when the magnetic material is saturated by a local magnetic field, the impedance discontinuity configured such that the first signal is reflected at the point of the impedance discontinuity, wherein the waveguide comprises a copper core and a conductive wire wound along a longitudinal axis of the core in a spiral, the core and the spiral wound conductive wire being receivable within the cylinder of magnetic material;
wherein the cylinder of magnetic material encases the waveguide.

10. The sensor according to claim 9, wherein the waveguide is one of a microstrip waveguide, a stripline waveguide, or a rectangular waveguide.

11. The sensor according to claim 9, further comprising a first conductive layer disposed on the waveguide, the first conductive layer electrically coupled to the signal generator and the signal receiver.

12. The sensor according to claim 11, further comprising a second conductive layer disposed between the waveguide and the magnetic material, the second conductive layer configured to shield the waveguide from electrical interference.

13. The sensor according to claim 12, wherein the second conductive layer is grounded.

14. A method of determining a position of a moveable object comprising:

generating a first signal by a signal generator;
communicating the first signal to a waveguide of an extended stroke position sensor, the extended stroke position sensor comprising the waveguide and a cylinder of magnetic material positioned in close proximity to the waveguide, the cylinder of magnetic material comprising soft or semi-soft magnetic material, wherein the waveguide comprises a copper core and a conductive wire wound along a longitudinal axis of the core in a spiral, the core and the spiral wound conductive wire being receivable within the cylinder of magnetic material;
moving a magnet into close proximity to the extended stroke position sensor, the magnet configured to generate a magnetic field sufficient to locally saturate the magnetic material, wherein the magnetic material configures to cause an impedance discontinuity in the waveguide such that the first signal is reflected at the point of the impedance discontinuity;
communicating the reflected signal to a signal receiver; and
determining the position of the moveable object based on the received first signal and the received reflected signal;
wherein the cylinder of magnetic material encases the waveguide.

15. The method according to claim 14, wherein determining the position of the moveable object comprises: measuring the time delay between the generation of the first signal and the receipt of the reflected signal; and correlating the time delay with the position of the moveable object.

16. The method according to claim 14, wherein determining the position of the moveable object comprises: measuring the phase difference between the first signal and the reflected signal; and correlating the phase difference with the position of the moveable object.

* * * * *